F. W. ROBERTSHAW.
VENT T FOR LAVATORIES.
APPLICATION FILED MAR. 17, 1917.

1,292,517.

Patented Jan. 28, 1919.
2 SHEETS—SHEET 1.

WITNESSES

INVENTOR

UNITED STATES PATENT OFFICE.

FREDERICK W. ROBERTSHAW, OF PITTSBURGH, PENNSYLVANIA.

VENT-T FOR LAVATORIES.

1,292,517. Specification of Letters Patent. Patented Jan. 28, 1919.

Application filed March 17, 1917. Serial No. 155,536.

*To all whom it may concern:*

Be it known that I, FREDERICK W. ROBERTSHAW, a citizen of the United States, residing at Pittsburgh, Allegheny county, Pennsylvania, have invented a new and useful Improvement in Vent-T's for Lavatories, of which the following is a full, clear, and exact description, reference being had to the accompanying drawings, forming part of this specification, in which—

Figure 1:
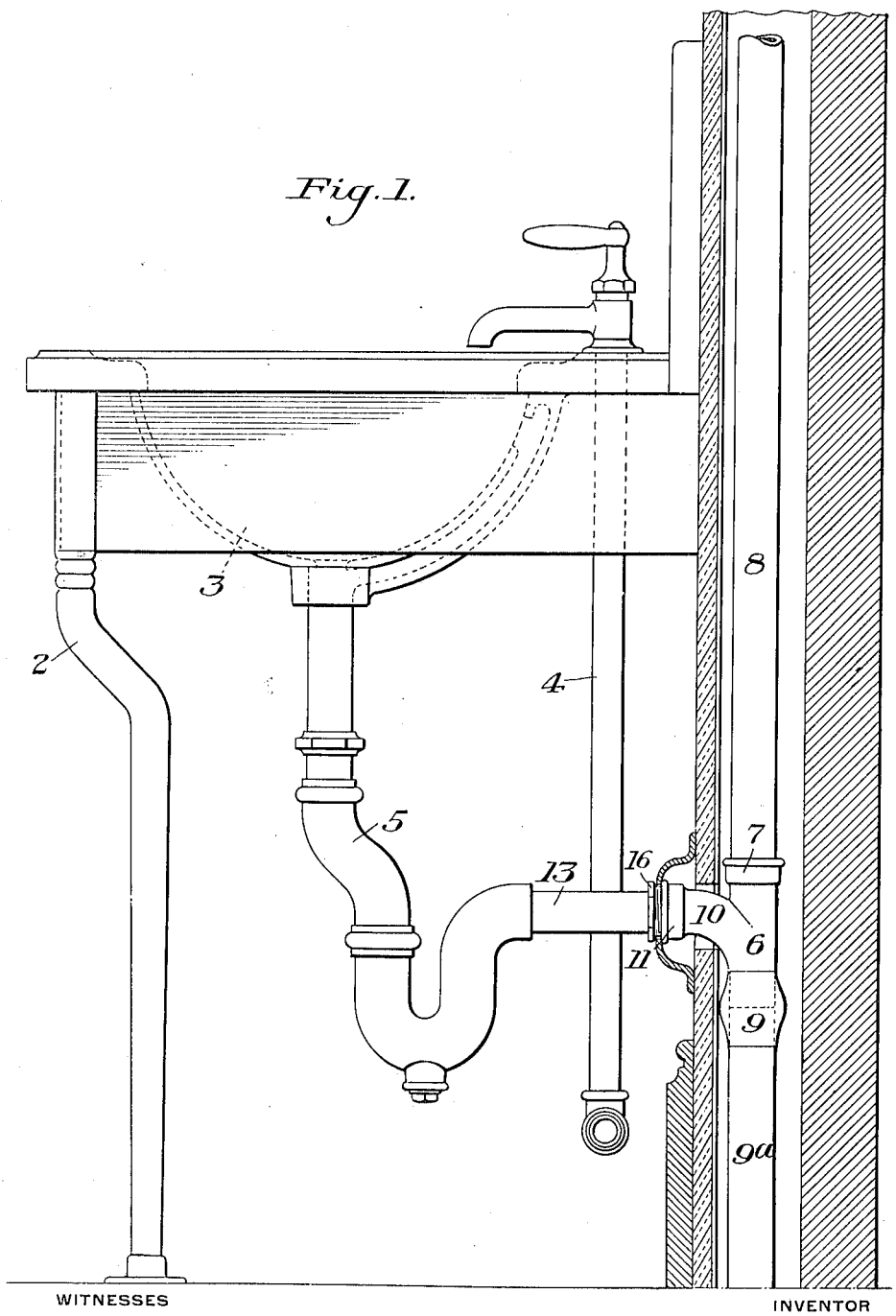
Figure 1 is a view, partly in vertical section, partly in side elevation, showing my invention applied to a lavatory.
Figure 2:
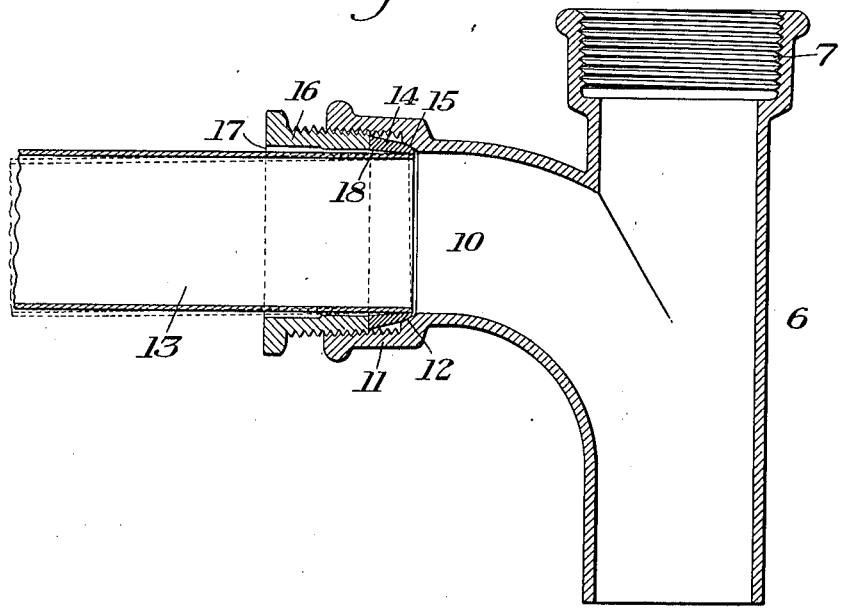
Fig. 2 is a vertical section of the T.
Figure 3:
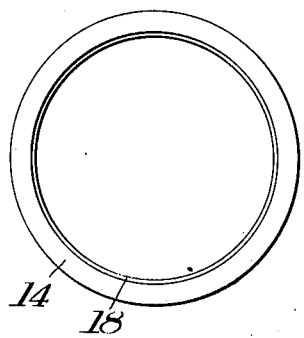
Fig. 3 is a plan view of the packing ring.
Figure 4:
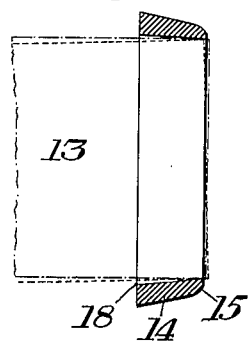
Fig. 4 is a detail sectional view showing the packing ring applied to the nipple.

My invention has relation to vent T's for lavatories, and is designed to provide a simple form of T by means of which a water-tight connection may be readily and quickly made with the outlet from a lavatory bowl. My invention also provides a T of this character having a certain amount of flexibility whereby the making of a connection is greatly facilitated.

My invention will be best understood by reference to the accompanying drawings, in which I have shown a preferred embodiment thereof, and which will now be described, it being premised, however, that the invention is susceptible of various changes in the arrangement, construction and combination of the parts without departing from the spirit of the invention as defined in the appended claims.

In these drawings the numeral 2 designates a lavatory stand having a bowl 3, a water supply connection 4, and a trapped outlet 5. These parts may all be of any usual or suitable arrangement, and form no part of my present invention.

6 designates one of my improved T's which is preferably made in the form of an integral casting, having an upper arm provided with an internally threaded socket 7 for connection with the usual vent pipe 8; a downwardly extending arm for connection in any suitable manner, as by the wiped joint 9, with the waste pipe 9ª and having the curved laterally projecting arm 10 for connection with the outlet 5. The arm 10 is provided at its outer end with an internally threaded socket portion 11; and beyond this internally threaded portion with a beveled seating shoulder or surface 12 of less internal diameter than the internal diameter of the portion 11. 13 designates a short pipe section or nipple which forms the connection between the arm 10 and the trapped bowl outlet 5. This pipe section or nipple is adapted for insertion within the other end portion of the arm 10, and carries at its inner end portion a metallic packing ring 14 having a beveled seating surface 15 adapted to the beveled surface 12, before described. 16 is a nut adapted to screw into the threaded portion 11 and against the ring 14.

By screwing up the nut 16, the packing ring is caused to make a close fitting seat with the seating surface 15. I preferably somewhat taper outwardly the internal bore or opening of the nut 16, as indicated at 17; and may also provide the bore of the ring 14 with a similar taper, as shown at 18. The provision of these clearances permits an adjustment of the pipe section or nipple 13 through a small angle so as to enable it to be readily adapted to make a proper connection with the outlet 5. In making connections of this character it frequently happens that the end of the trapped outlet 5 is not properly alined with the vent T, and considerable difficulty is experienced in making a proper connection with the parts as heretofore constructed. This is entirely obviated by my improved construction. With the nut 16 loosened, there may not only be some movement of the pipe section or nipple 13 in the packing ring 14, but the latter may also have a slight rocking movement on the seating surface of 12. These movements give the necessary range of adjustment.

Where a cheaper form of connection is desired, the same vent T may be employed, but instead of the nipple 13, packing ring 14, and nut 16, an ordinary threaded nipple or pipe section may be screwed into the socket portion 11 of the T.

My invention provides an extremely simple and convenient form of vent T by means of which an effective connection can be quickly made with the outlet of the lavatory bowl. The pipe section or nipple 13 can be readily cut to the desired length to suit any particular case, and when made of relatively thin metal, the nut 16 may be screwed up sufficiently tight to not only jam the packing ring against the beveled seating surface at 12, but also to slightly compress it upon the end of the nipple, thus insuring a perfectly tight joint. This is possible notwithstanding a considerable angular adjustment of the section or nipple 13.

I claim:

1. The combination with a lavatory vent T, having a lateral arm provided with an internally threaded socket portion at its outer end, and with an inclined beveled packing seating surface adjacent to the inner end of the threaded portion, of a pipe section or nipple inserted in said socket portion, a packing ring seating on the end of the nipple or pipe section and having a tapered outer surface adapted to said seating surface, and also having its bore outwardly tapered, the end of said nipple or pipe section terminating within and fulcruming upon the inner surface of said ring, and a neck adapted to the thread of said socket portion and bearing against the outer end of said ring, said nut having an inner clearance around the pipe section, said clearance and the internal taper of the packing ring permitting angular adjustment of said pipe section about its fulcrum point in said ring; substantially as described.

2. The combination with a lavatory vent T having a lateral arm provided with an internally threaded socket portion at its outer end, and with an internal beveled seating surface, of a pipe section or nipple adapted for insertion within said socket portion, a packing ring seated on the end portion of the nipple or pipe section and having a beveled surface adapted to the first named beveled surface, a nut adapted to the thread of said socket portion and arranged to seat against the outer end of the packing ring, said nut having an internal bore of larger diameter than the external diameter of that portion of the pipe section or nipple which seats therein, and said packing ring having an outwardly tapered internal bore, such tapering and the clearance in the nut permitting angular adjustment of said pipe section, substantially as described.

In testimony whereof, I have hereunto set my hand.

FREDERICK W. ROBERTSHAW.

Witnesses:
GEO. H. PARMELEE,
H. M. CORWIN.